United States Patent
Kumar (10) Patent No.: US 11,360,785 B2
(45) Date of Patent: *Jun. 14, 2022

(54) EXECUTION PATH DETERMINATION IN A DISTRIBUTED ENVIRONMENT

(71) Applicant: EMC IP Holding Company LLC, Hopkinton, MA (US)

(72) Inventor: Vinod Kumar, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/597,764

(22) Filed: Oct. 9, 2019

(65) Prior Publication Data

US 2020/0042325 A1 Feb. 6, 2020

Related U.S. Application Data

(63) Continuation of application No. 13/630,966, filed on Sep. 28, 2012, now Pat. No. 10,481,918.

(51) Int. Cl.
*G06F 9/445* (2018.01)
*G06F 9/50* (2006.01)
*G06F 9/455* (2018.01)

(52) U.S. Cl.
CPC ......... *G06F 9/445* (2013.01); *G06F 9/50* (2013.01); *G06F 9/455* (2013.01)

(58) Field of Classification Search
CPC . G06F 9/445; G06F 9/50; G06F 9/455; G06F 9/5038; G06F 11/3466
See application file for complete search history.

(56) References Cited

U.S. PATENT DOCUMENTS

| | | | |
|---|---|---|---|
| 4,914,571 A | 4/1990 | Baratz | |
| 6,577,653 B1 | 6/2003 | Rochberger | |
| 2002/0199032 A1* | 12/2002 | Seidman | G06F 9/547 719/315 |
| 2003/0195959 A1* | 10/2003 | Labadie | H04L 69/329 709/224 |
| 2004/0098663 A1 | 5/2004 | Rey | |
| 2004/0117224 A1* | 6/2004 | Agarwal | G06Q 30/04 705/412 |
| 2004/0177141 A1 | 9/2004 | Foody | |
| 2004/0267676 A1 | 12/2004 | Feng | |
| 2005/0021708 A1* | 1/2005 | Raghuraman | G06Q 10/10 709/223 |
| 2005/0063335 A1 | 3/2005 | Shenfield | |
| 2005/0086117 A1 | 4/2005 | Kanisawa | |

(Continued)

OTHER PUBLICATIONS

Soumen Chatterjee, "Message Patterns in Service-Oriented Architecture, Part 1", Apr. 2004, pp. 1-20.

*Primary Examiner* — Doon Y Chow
*Assistant Examiner* — Phuong N Hoang
(74) *Attorney, Agent, or Firm* — Krishnendu Gupta; Nikhil Patel (57) ABSTRACT

Techniques to determine an execution path in a distributed environment are disclosed. A call to a method or function of a component of the distributed system is received, in connection with a request from a user of the distributed system. A unique correlation identifier that includes data that identifies the component, the request, and the method of function called is generated for the call.

22 Claims, 6 Drawing Sheets

(56) References Cited

U.S. PATENT DOCUMENTS

| | | | |
|---|---|---|---|
| 2005/0172306 A1* | 8/2005 | Agarwal | G06F 11/008 |
| | | | 719/328 |
| 2005/0223021 A1* | 10/2005 | Batra | G06Q 10/00 |
| 2006/0023674 A1 | 2/2006 | Goring | |
| 2006/0080682 A1 | 4/2006 | Anwar | |
| 2008/0235365 A1* | 9/2008 | Bansal | H04L 43/16 |
| | | | 709/224 |
| 2009/0125563 A1 | 5/2009 | Wong | |
| 2009/0138595 A1* | 5/2009 | Sluiman | G06F 11/3447 |
| | | | 709/224 |
| 2009/0175436 A1 | 7/2009 | Sarin | |
| 2009/0181657 A1 | 7/2009 | Ramanathan | |
| 2010/0070753 A1 | 3/2010 | Kido | |
| 2010/0281488 A1* | 11/2010 | Krishnamurthy | G06F 11/3495 |
| | | | 718/106 |
| 2010/0287541 A1 | 11/2010 | Saunders | |
| 2011/0154370 A1 | 6/2011 | Yu | |
| 2011/0225307 A1* | 9/2011 | George | H04L 69/10 |
| | | | 709/227 |
| 2013/0347004 A1* | 12/2013 | Day | G06F 9/546 |
| | | | 719/313 |

* cited by examiner

EXECUTION PATH DETERMINATION IN A DISTRIBUTED ENVIRONMENT

CROSS REFERENCE TO OTHER APPLICATIONS

This application is a continuation of co-pending U.S. patent application Ser. No. 13/630,966, entitled EXECUTION PATH DETERMINATION IN A DISTRIBUTED ENVIRONMENT filed Sep. 28, 2012 which is incorporated herein by reference for all purposes.

BACKGROUND OF THE INVENTION

In a typical distributed system it can be difficult to determine the execution path of a request. It becomes much harder to do so when multiple and/or different products or other components can be inserted into the execution path, for example via plug-ins or other configurations based on customer requirements. Product support engineers typically have to understand the complete deployment topology to understand the request flow.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating and storing a unique correlation identifier for a method/function call in a distributed environment, for example to facilitate execution path determination, is disclosed. In various embodiments, each product/component and each function call within each product/component is identified by a unique identifier. In some embodiments, each product/component in the distributed environment defines its unique identity in a distributed system, and is configured to generate and store for each function (or other method) call a unique identifier.

Figure 1:
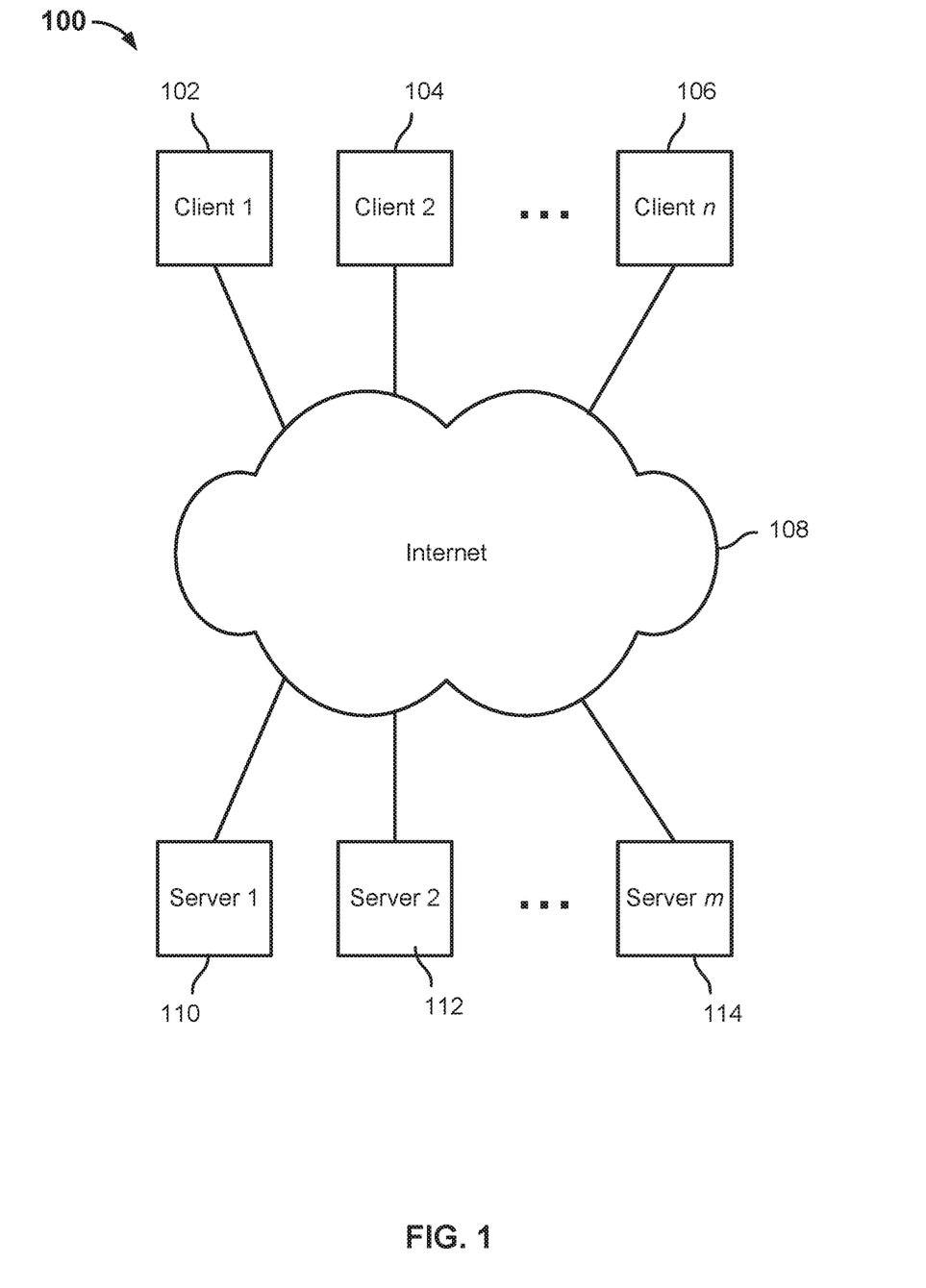
FIG. 1 is a block diagram illustrating an embodiment of a distributed system.

FIG. 1 is a block diagram illustrating an embodiment of a distributed system. In the example shown, the distributed system 100 includes a plurality of client systems, represented in FIG. 1 by clients 102, 104, and 106, connected via the Internet 108 to a plurality of servers, represented in FIG. 1 by servers 110, 112, and 114. We may also add few second tier servers as well. For example Server 1 may call to Server 2 or directly server the client request. The client systems 102, 104, and 106 may be desktop or laptop computers, mobile smart phones or other mobile devices, or any system that includes a processor, a memory or other storage device, and a communication interface to communicate via a network such as Internet 108. We may include more generic example without mentioning content server client or server. The servers 110, 112, and 114 may be separate physical systems or one or more servers may run on a single physical system. The distribute system 100 in some embodiments may include on servers such as 110, 112, and 114 one or more functionally distinct components of an application and/or service provided via distributed system 100. For example, the distributed system 100 may provide to clients such as clients 102, 104, and 106, access to an application or service that includes one or more base applications and in addition one or more "plug ins" or other additions to and/or customizations of the base application(s) and/or service(s). In some cases, a distributed system may include numerous applications or functional modules thereof and/or multiple plug ins, arranged in one of potentially a plurality of possible configurations. In such a system, without using techniques disclosed herein the execution path of function and/or other calls associated with an underlying request, for example a user request from a client such as 102, 104, or 106, can be challenging or in some cases nearly impossible to determine, for example as functions calls are made across libraries and/or between components residing on one or more servers, such as servers 110, 112, and 114.

Figure 2:
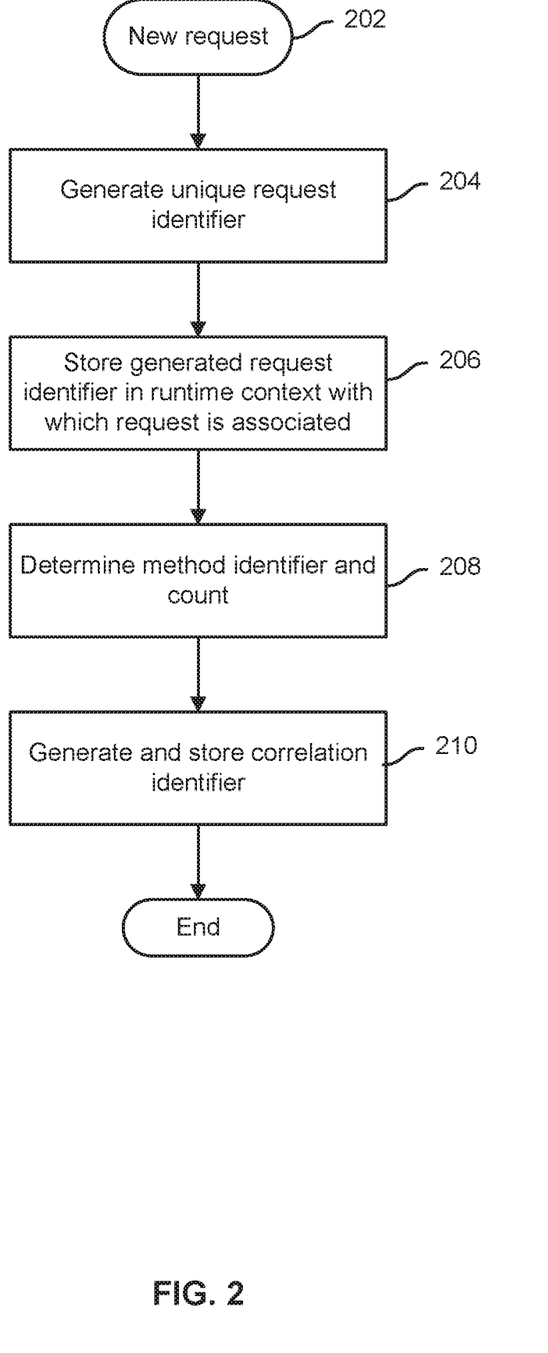
FIG. 2 is a flow chart illustrating an embodiment of a process of processing requests in a distributed system.

FIG. 2 is a flow chart illustrating an embodiment of a process of processing requests in a distributed system. In the example shown, when a new request is received (202), a unique request identifier is generated for the request (204). A "request" in this context may be received at a component of a distributed system from a client, such as clients 102, 104, or 106 of FIG. 1. The request may require one or more function calls to be made by and/or between components of the distributed system, for example to obtain or verify credentials and/or internal information, to access content required to be provided and/or manipulated in response to the request, and/or to update state information to reflect the request and/or operations performed in response to the request. The generated request identifier (204) is stored in a manner that associates the request identifier with a runtime context with which the request is associated (206), for example, a session or other state information associated with a client from which the request was received, etc. In some embodiments, the request identifier comprises a counter, for example a request identifier having a value n would indicate that the request is the nth request received by that component. A method required to be performed by the component that received the request is determined, for example based on information included in the request (e.g., function or operation called), and an associated method identifier and method counter data are determined (208). The method identifier uniquely identifies the method within the component that received the request. In some embodiments, the method identifier may include a function name. The method counter reflects how many methods have been called in connection with the current request. A unique correlation identifier is generated, for example using one or more of the request identifier, the method identifier, and the method count, and stored (210). In some embodiments, the unique correlation identifier includes an identifier of the product or other component that received the request.

The following is an example of a correlation identifier format as implemented in some embodiments:

Correlation id=<Product id: request counter: method call counter: method name>

Example: 200.2.1.foo

Means this correlation id was generated as a result of:

2$^{nd}$ request to product with product id 200

Called "foo" function, which is the 1$^{st}$ method call after the request enter into product 200

Figure 3:
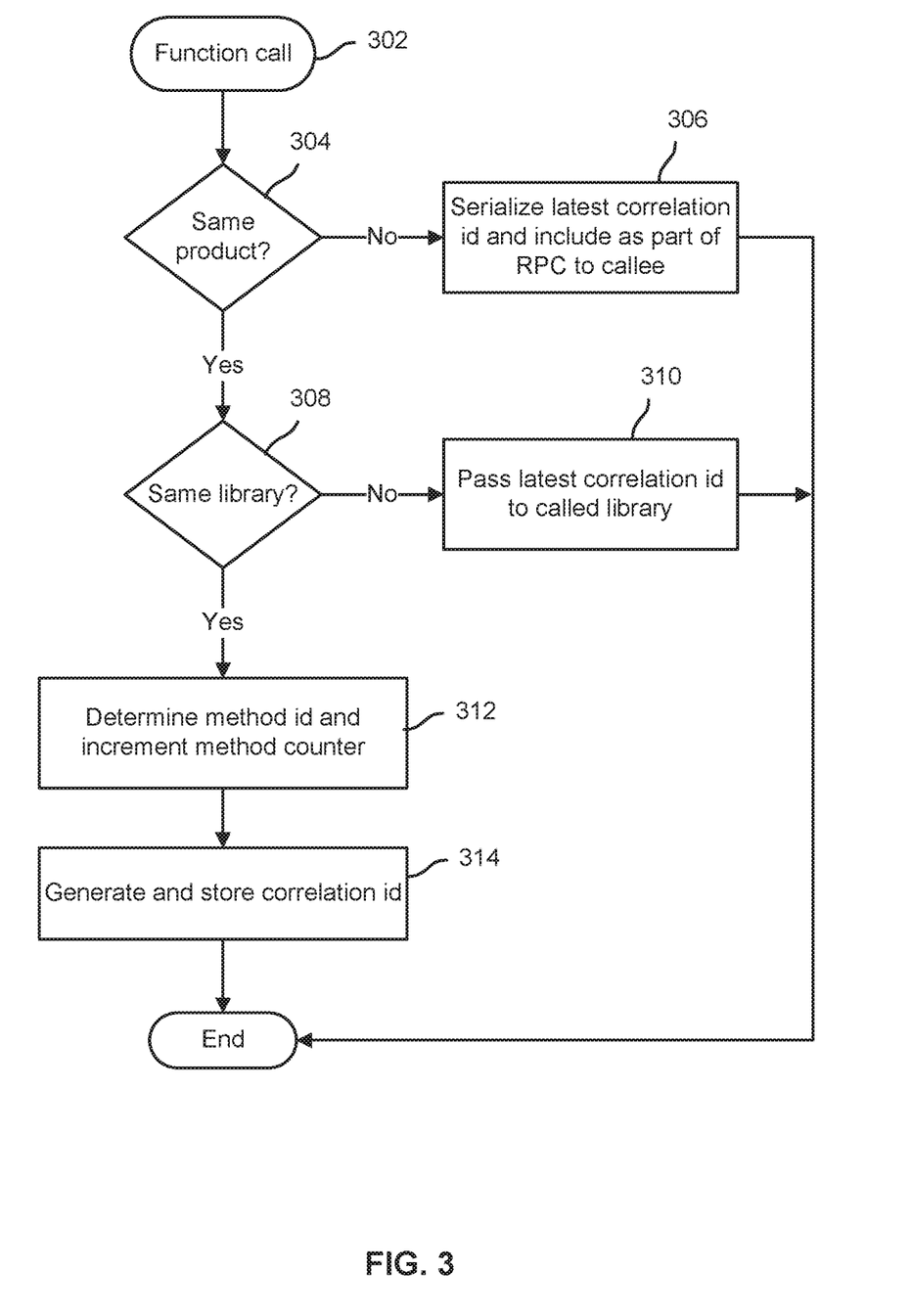
FIG. 3 is a flow chart illustrating an embodiment of a process of processing a function call in a distributed system.

FIG. 3 is a flow chart illustrating an embodiment of a process of processing a function call in a distributed system. In the example shown, when a function call is made (302) to a function associated with a different product/component (304), the calling product/component serializes at least a portion of its latest correlation identifier and includes the serialized data as part of a remote procedure call (RPC) to the callee (306). If the call is made to a function within the same product or component (304) but in a different library than the most recently called function (308) the latest correlation identifier is passed to the called library (310). If the call is made to a different function within the same product/component and library (304, 308), the method identifier is determined (in some embodiments, omitted if already known, e.g., the method or function name is used as the identifier) and the method counter is incremented (312), and a unique correlation identifier is generated and stored (314).

The following is an example of a correlation identifier format, as implemented in some embodiments, for example when a call is made to another product or component comprising the distributed system, as in 306 of FIG. 3:

Correlation id=<Product id: request counter: method call counter: method name>

Example: 200.2.1.foo.300.1.1.bar

Means this correlation id was generated as a result of

2$^{nd}$ request to product with product id 200

Called "foo" function, which is the 1$^{st}$ method call after the request enter into product 200

Product 200 makes a call to product with product id 300

It is the 1$^{st}$ request to product with id 300

Product with id 300 Called "bar" function, which is the 1$^{st}$ method call after the request enter into product with id 300

Figure 4:
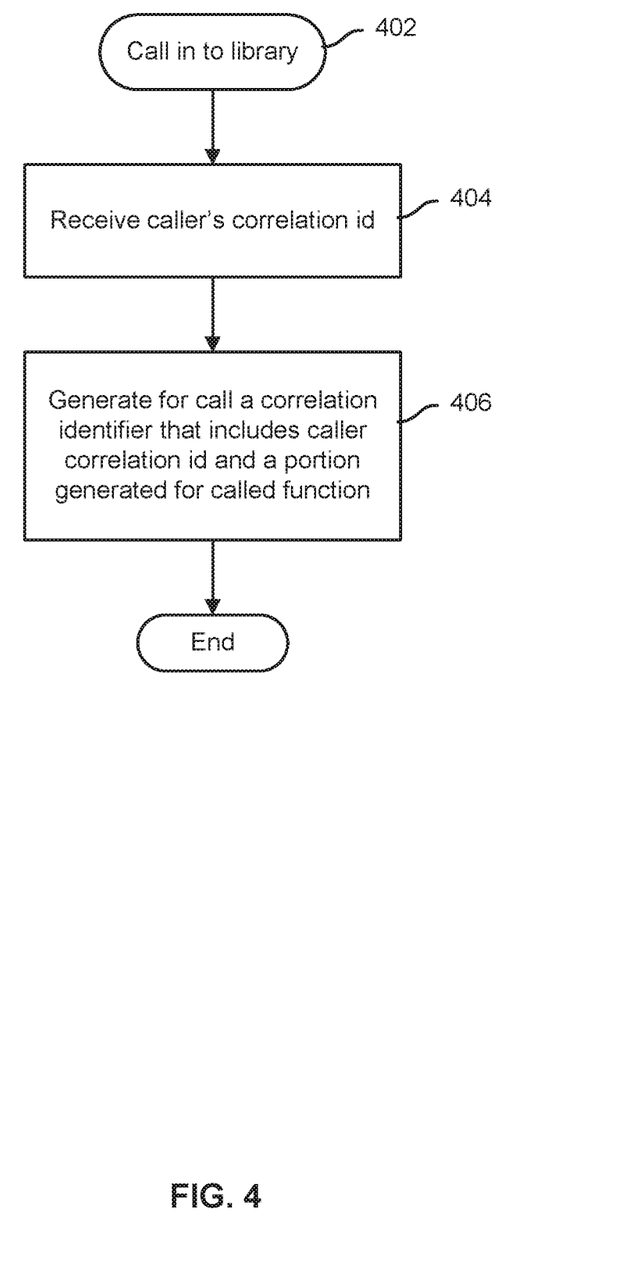
FIG. 4 is a flow chart illustrating an embodiment of a process of processing a function call from a calling source external to a called library.

FIG. 4 is a flow chart illustrating an embodiment of a process of processing a function call from a calling source external to a called library. In the example shown, when a call is made in to a function of a library for the first time (for a given request) (402), the calling product/component's latest correlation identifier is received (404) and used to generate for the call a correlation identifier that includes the caller correlation identifier received from the caller and also a portion generated for the call to the called function (406), resulting in some embodiments in a combined correlation identifier as in the example described above for a call between products/components.

Figure 5:
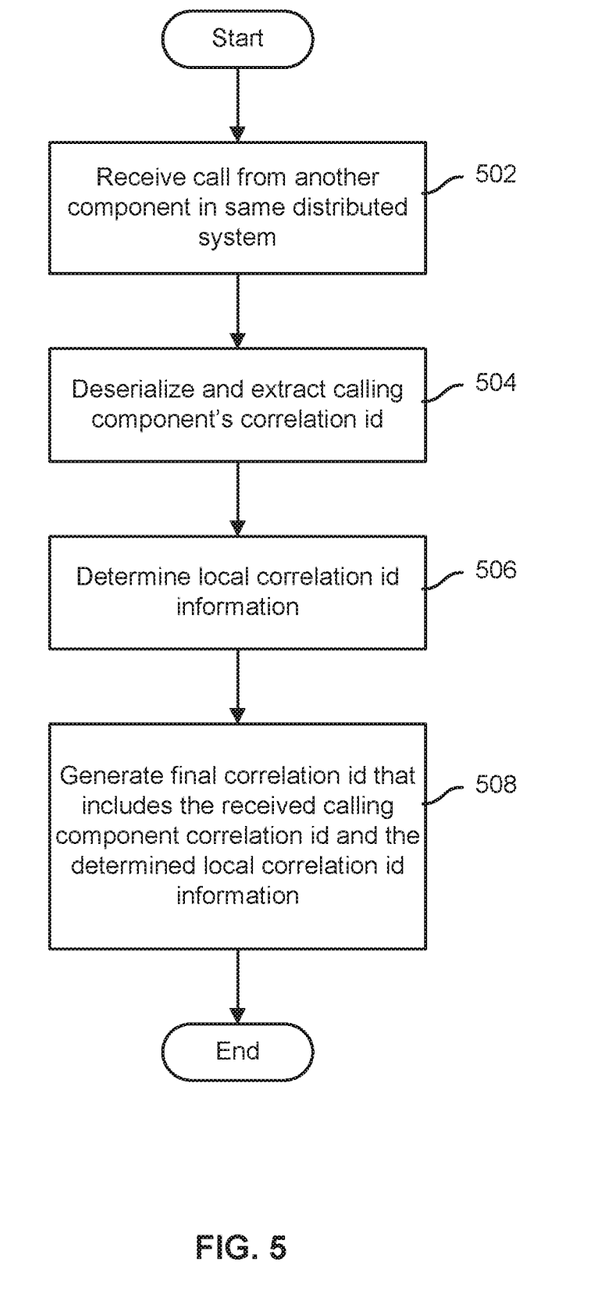
FIG. 5 is a flow chart illustrating an embodiment of a process of processing a function call from a calling source external to a called component.

FIG. 5 is a flow chart illustrating an embodiment of a process of processing a function call from a calling source external to a called component. In the example shown, a call is received from another product/component in the same distributed system (502). The call data is deserialized and a calling product/component correlation identifier included in the call data by the calling party is extracted (504). A local correlation identifier information is determined for the call, e.g., a method identifier associated with the called function is determined and local method counter is initialized to an initial value of "1" (506). The extracted calling party correlation identifier and generated local correlation identifier information are used to generate a final correlation identifier (508), as in the example described above (i.e., 200.2.1.foo.300.1.1.bar).

Figure 6:
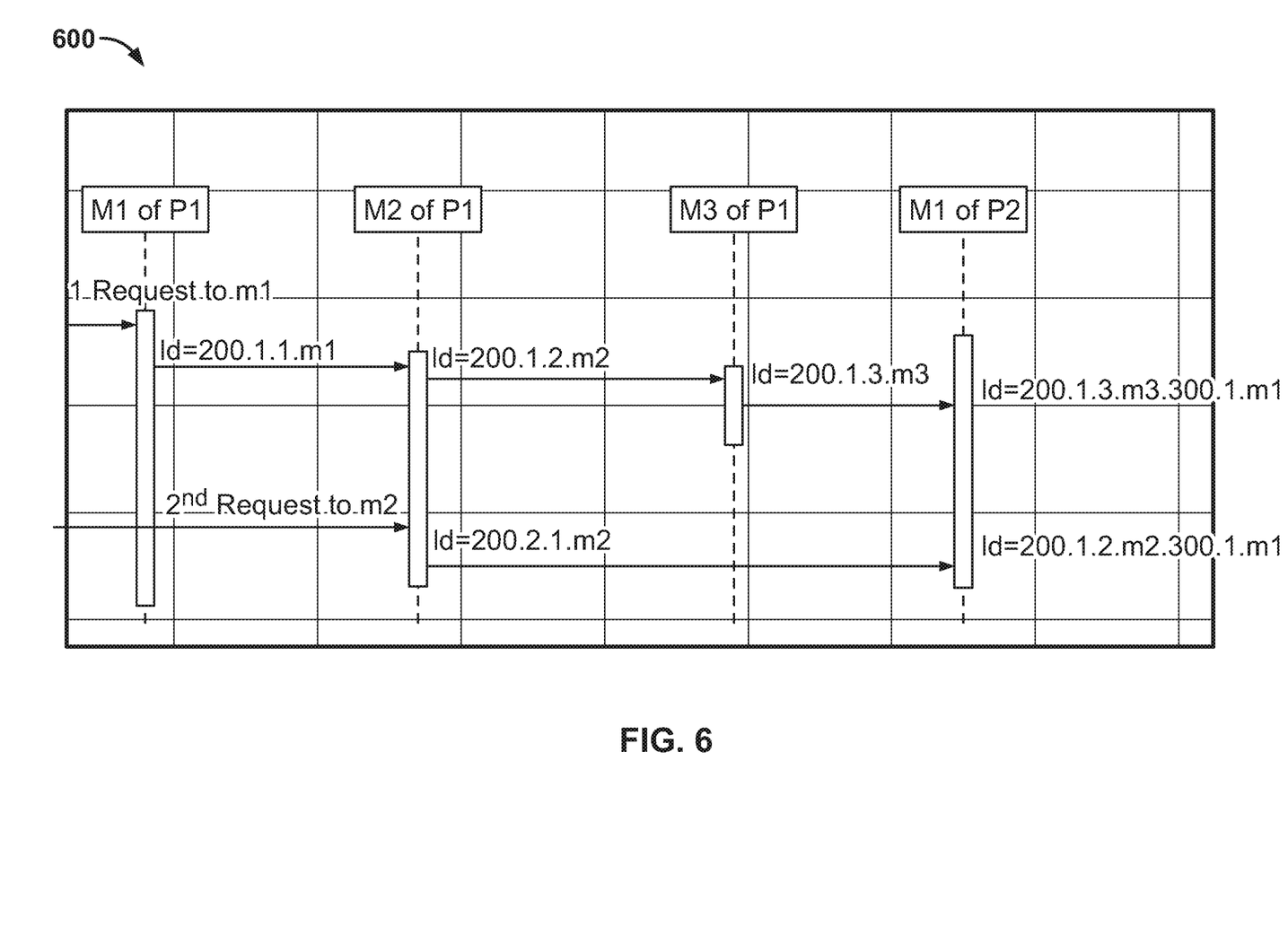
FIG. 6 is a block diagram illustrating an example of a sequence of method calls in an embodiment of a distributed system.

FIG. 6 is a block diagram illustrating an example of a sequence of method calls in an embodiment of a distributed system. In the example shown, the sequence of calls 600 includes a first request to a method "M1" of a product/component "P1", resulting in a correlation identifier of Id=200.1.1.m1 being generated. In this example "200" is the product/component identifier; the first "1" identifies the call as being associated with the request "1"; the second "1" indicates this is the first method called in connection with this request; and "m1" identifies the method called. If response to the request, a second method, M2, of the same product P1 is called. The correlation identifier Id=200.1.2.m2 is generated, identifying the call as one to product P1 (product id=200) in connection with request=1, second method call this request, to method M2 (method id=m2). Next, a third method M3 within product P1 is called, resulting in correlation identifier Id=200.1.3.m3. Next, a method M1 in product P2 (product id=300), resulting in correlation identifier Id=200.1.3.m3.300.1.1.m1; i.e., call from product P1, where the last call was the third method called for request 1, to method M3, and the call was in to product P2 (id=300), to method M1 of P2, the first method called this product P2 for request 1. In the lower sequence, a second request (request id=2) is received by product P1, but in to method M2 in this case, resulting in correlation identifier Id=200.2.1.m2 (called product P1, second request, first method call this request, made to method M2). Continuing the lower sequence, a call to method M1 of product P2 would result in an inter-product correlation identifier Id=200.2.1.m2.300.1.m1.

While specific correlation identifier formats and contents are described in connection with some embodiments, in other embodiments other and/or different information may be included and/or represented in other and/or different ways. In various embodiments, correlation identifiers generated as described herein may be logged and/or otherwise reported and/or stored. Such identifiers may be used, in various embodiments, to troubleshoot or otherwise analyze system performance, for example and without limitation to track back a sequence of calls to determine the source of an error or other problem and/or to detect and localize bottlenecks or other performance issues. In some embodiments, such analysis is or may be at least partly automated. The correlation identifiers are parsed programmatically to generate a map, listing, or other representation of the sequence of calls associated with a request. In some embodiments, data associated with a request and its processing may be generated and stored in a manner such that the correlation identifier(s) generated and stored as described herein may be used to retrieve such associated information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing a request in a distributed system, comprising:
receiving, by one or more processors associated with a first component of the distributed system, in connection with a request from a client device of the distributed system, a first call to a method or function of the first component;
generating a unique request identifier corresponding to the request;
storing the unique request identifier in a manner that associates the unique request identifier with a related runtime context by storing a session or other state information related to the client device with the unique request identifier, wherein the request identifier includes a counter with a value corresponding to a number of requests received by the first component, wherein the unique correlation identifier further comprises data that identifies: a request counter identifier that identifies the request in relation to another request received by the distributed system;
generating, by the one or more processors associated with the first component of the distributed system, a unique correlation identifier for the first call, the unique correlation identifier comprising data that identifies: the first component associated with the request, a method counter identifier indicating a sequential place of the first call within a sequence of calls associated with the request; and
providing, by the one or more processors associated with the first component of the distributed system, the unique correlation identifier to a second component, wherein the first component corresponds to one of a plurality of components of the distributed system.

2. The method of claim 1, wherein the distributed system comprises a plurality of products integrated to provide the distributed system and the first component includes one or more of the products.

3. The method of claim 1, wherein the unique correlation identifier further comprises data that identifies: an identifier of a method of the first component or a function of the first component that is called.

4. The method of claim 1, wherein the unique correlation identifier is provided to the second component of the distributed system in connection with a second call by the first component to the second component in connection with the request from the client device.

5. The method of claim 1, further comprising storing the unique correlation identifier.

6. The method of claim 1, further comprising providing the unique correlation identifier as output.

7. The method of claim 1, further comprising using the unique correlation identifier to analyze a failure associated with the request.

8. The method of claim 1, further comprising using the unique correlation identifier to analyze a system performance issue associated with the request.

9. The method of claim 1, further comprising parsing the unique correlation identifier to determine at least in part programmatically an execution path or portion thereof associated with the request.

10. The method of claim 1, wherein a second call is received from another component of the distributed system.

11. The method of claim 10, wherein receiving the second call includes receiving in connection with the second call a latest correlation identifier of the component from which the second call is received.

12. The method of claim 11, further comprising using the latest correlation identifier of the component from which the second call is received to generate the unique correlation identifier for the second call.

13. The method of claim 12, wherein receiving the first call includes receiving in connection with the first call a calling party correlation identifier associated with the first call into the calling method or function.

14. The method of claim 11, further comprising including at least a portion of the latest correlation identifier of the component from which the second call is received in the unique correlation identifier for the second call.

15. The method of claim 1, wherein the first call is received from a calling method or function of the first component but external to a called library with which the called method or function is associated.

16. The method of claim 1, wherein the request counter identifier corresponds to an integer n, which indicates that the request received at the first component corresponds to an nth request received by the first component.

17. The method of claim 1, wherein the unique identifier for the first call to the method or function of the first component is serialized with additional information to form an inter-product correlation identifier, such additional information identifying: the second component to which the second call is made by the first component, a method of the second component subject to the second call made by the first component, and a method counter identifier that identifies the method associated with the second component that is called in connection with the request in relation to other methods of the second component called in connection with the request.

18. The method of claim 1, wherein the unique correlation identifier is associated with a runtime context with which the request is associated.

19. The method of claim 1, further comprising:
receiving, at the second component, the unique correlation identifier in connection with a second call from the first component;
determining a local correlation identifier in connection with a third call to be made by the second component to a third component of the plurality of components in the distributed system; and generating a combined correlation identifier, wherein the combined correlation identifier includes the local correlation identifier and at least a part of the unique correlation identifier.

20. The method of claim 19, wherein the generating the combined correlation identifier comprises serializing the local correlation identifier with the unique correlation identifier.

21. A distributed system, comprising:
a processor configured to:
receive at a first component of the distributed system, in connection with a request from a client device of the distributed system, a first call to a method or function of the first component;
generate a unique request identifier corresponding to the request;
store the unique request identifier in a manner that associates the unique request identifier with a related runtime context by storing a session or other state information related to the client device with the unique request identifier, wherein the request identifier includes a counter with a value corresponding to a number of requests received by the first component, wherein the unique correlation identifier further comprises data that identifies: a request counter identifier that identifies the request in relation to another request received by the distributed system;
generate for the first call a unique correlation identifier that includes data that identifies the first component associated with the request, a method counter identifier indicating a sequential place of the first call within a sequence of calls associated with the request; and
provide the unique correlation identifier to a second component; and
a memory or other storage device coupled to the processor and configured to store the unique correlation identifier;
wherein the first component corresponds to one of a plurality of components of the distributed system.

22. A computer program product embodied in a tangible, non-transitory computer-readable storage medium and comprising computer instructions for:
receiving, by one or more processors associated with a first component of a distributed system, in connection with a request from a client device of the distributed system, a first call to a method or function of the first component;
generating a unique request identifier corresponding to the request;
storing the unique request identifier in a manner that associates the unique request identifier with a related runtime context by storing a session or other state information related to the client device with the unique request identifier, wherein the request identifier includes a counter with a value corresponding to a number of requests received by the first component, wherein the unique correlation identifier further comprises data that identifies: a request counter identifier that identifies the request in relation to another request received by the distributed system;
generating, by the one or more processors associated with the first component of the distributed system, a unique correlation identifier for the first call, the unique correlation identifier comprising data that identifies the first component associated with the request, a method counter identifier indicating a sequential place of the first call within a sequence of calls associated with the request; and
providing, by the one or more processors associated with the first component of the distributed system, the unique correlation identifier to a second component,
wherein the first component corresponds to one of a plurality of components of the distributed system.

* * * * *